(12) United States Patent
Gagliardi, Jr.

(10) Patent No.: US 6,238,281 B1
(45) Date of Patent: May 29, 2001

(54) METHOD OF MAKING A BIRD MEAT PRODUCT

(75) Inventor: Eugene D. Gagliardi, Jr., Atglen, PA (US)

(73) Assignees: Visionary Design; Bojangles' International, L.L.C., both of Charlotte, NC (US)

( * ) Notice: Subject to any disclaimer, the term of this patent is extended or adjusted under 35 U.S.C. 154(b) by 0 days.

(21) Appl. No.: 09/448,574

(22) Filed: Nov. 23, 1999

(51) Int. Cl.[7] .................................................. A22C 21/00
(52) U.S. Cl. ............................................ 452/135; 452/149
(58) Field of Search .................................... 452/135, 149, 452/155, 160

(56) References Cited

U.S. PATENT DOCUMENTS

| | | | |
|---|---|---|---|
| 2,571,544 | * 10/1951 | Cutrera | 452/135 |
| 2,633,601 | * 4/1953 | Snyder | 452/135 |
| 3,594,189 | * 7/1971 | Panattoni | 452/135 |
| 3,644,125 | * 2/1972 | Leblondo et al. | 452/149 |
| 5,057,331 | * 10/1991 | Levison | 426/243 |
| 5,088,957 | * 2/1992 | Galiardi, Jr. | 452/135 |
| 5,368,519 | * 11/1994 | Curtis et al. | 452/135 |
| 5,667,436 | * 9/1997 | Galiardi, Jr. | 452/135 |
| 5,779,532 | * 7/1998 | Galiardi, Jr. | 452/135 |
| 5,932,278 | * 8/1999 | Galiardi, Jr. | 452/135 |

* cited by examiner

Primary Examiner—Willis Little
(74) Attorney, Agent, or Firm—Akin, Gump, Strauss, Hauer & Feld, L.L.P.

(57) ABSTRACT

A method of making a meat product from a bird, comprises cutting a first boneless breast lobe from the bird and cutting a second boneless breast lobe from the bird. Each of the first and second boneless breast lobes are cut lengthwise into at least two boneless breast portions. A first whole leg and a second whole leg is cut from the bird. The bones are removed from the first and second whole legs and each of the first and second whole legs are cut lengthwise into at least two boneless leg portions, each leg portion containing both thigh meat and drumstick meat. The boneless breast portions and the boneless leg portions are assembled to simulate the appearance of a bird. The method may alternatively include cutting a first boneless breast lobe and a second boneless breast lobe from a bird. A first and second whole leg are cut from the bird. The bones are removed from the first and second whole legs and each of the first and second whole legs are cut lengthwise into at least two boneless leg portions, each leg portion containing both thigh meat and drumstick meat. The first and second boneless breast lobes and the boneless leg portions are arranged to simulate the appearance of a bird.

17 Claims, 6 Drawing Sheets

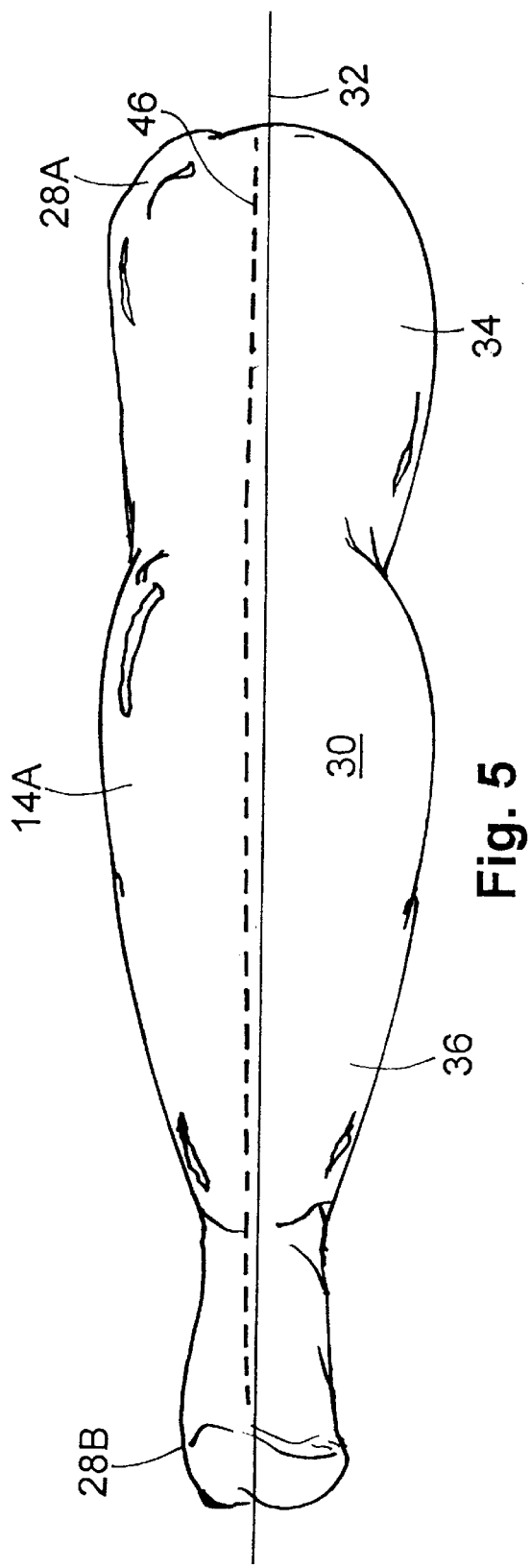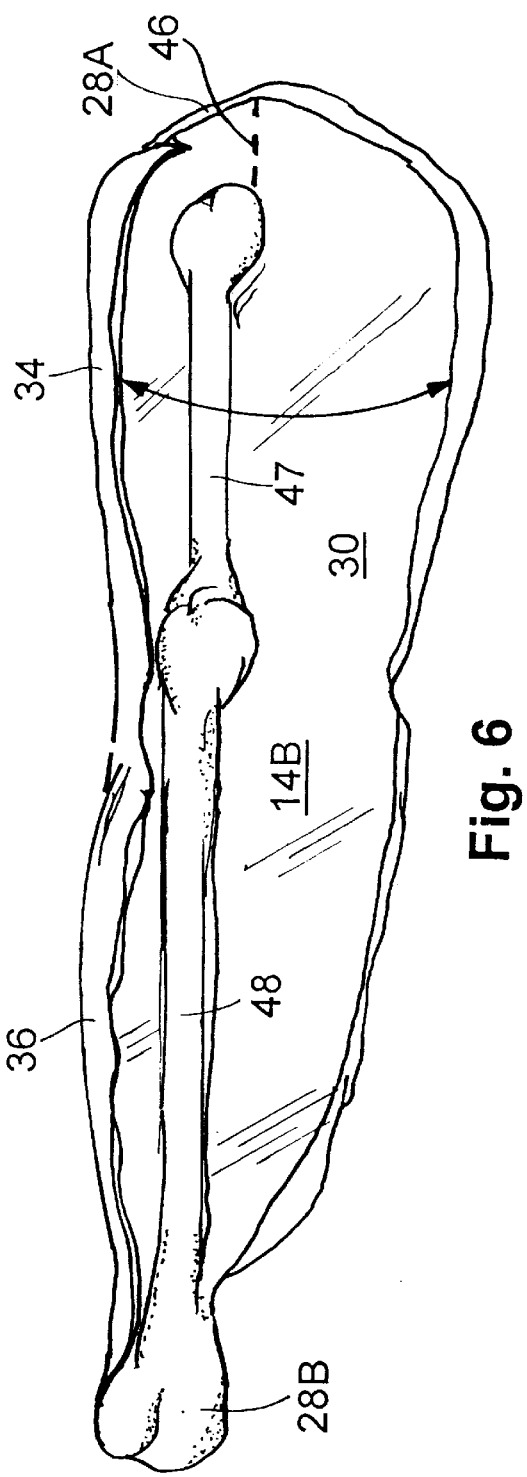
Fig. 5
Fig. 6

METHOD OF MAKING A BIRD MEAT PRODUCT

BACKGROUND OF THE INVENTION

The present invention relates to a method of making a meat product from a bird, as well as to the bird meat product produced thereby and, more specifically, to such a bird meat product which is deboned to form a bird meat product having minimal waste.

Birds, such as poultry and fowl, are conventionally eviscerated, dressed and sold either as a whole bird or as separate parts, i.e., breasts, thighs, drumsticks, wings, etc. Typically whole birds are sold with the skin in place and with the meat still attached to the bones.

In recent years, there has been an increasing demand for innovative meat products, particularly for products which require less time for preparation and which include little or no waste. There has also been an increasing demand for meat products which are boneless, or relatively boneless, which results in such meat products being easier to prepare and to consume. Hence, products such as boneless chicken breasts, chicken tenders, etc., have enjoyed tremendous commercial success. Other innovative products such as "hot wings," "buffalo wings," etc., have also obtained enhanced popularity for the respective cuts from which they are prepared.

Such innovative meat products are frequently sold by food services at large events, such as concerts, baseball games, football games, and other sporting events. Unfortunately, while the variety of meat products typically served at large sporting events tremendously enhances the enjoyment of the spectators and fans, the bones that are left over generate a significant amount of litter and waste that is often strewn throughout the stands. Even more problematic, is the throwing of bones onto the field by rowdy fans. Such a throwing of bones is, in the best case, rude and generally lowers the enjoyment of the sporting event for other spectators. In the worst case, the throwing of bones onto the athletic field can pose a safety hazard to athletes and can result in slip related and/or other injuries to athletes.

What is needed by those associated with the food preparation industry, but so far unavailable in the contemporary art, is a method of preparing a meat product from a bird that results in an attractive, boneless bird meat product which is ideal for distribution and sale by food services at large sporting events or other gatherings.

BRIEF SUMMARY OF THE INVENTION

Briefly stated, the present invention is directed to a method of making a meat product from a bird, comprising the steps of: cutting a first boneless breast lobe from the bird; cutting a second boneless breast lobe from the bird; cutting each of the first and second boneless breast lobes lengthwise into at least two boneless breast portions; cutting a first whole leg from the bird; cutting a second whole leg from the bird; removing the bones from the first and second whole legs; cutting each of the first and second whole legs lengthwise into at least two boneless leg portions, each leg portion containing both thigh meat and drumstick meat; and assembling the boneless breast portions and the boneless leg portions to simulate the appearance of a bird.

The invention is also directed to a method of making a meat product from a bird, comprising the steps of: cutting a first boneless breast lobe from the bird; cutting a second boneless breast lobe from the bird; cutting each of the first and second breast lobes generally in half lengthwise to provide four generally equally-sized boneless breast portions; cutting a first whole leg from the bird; cutting a second whole leg from the bird; removing the bones from each of the first and second whole legs; cutting each of the first and second whole legs generally in half to provide four generally equally-sized boneless leg portions, each leg portion containing both thigh meat and drumstick meat; and assembling the boneless breast portions and the boneless leg portions to simulate the appearance of a bird.

The invention is also directed to a method of making a meat product from a bird comprising the steps of: cutting a first boneless breast lobe from the bird; cutting a second boneless breast lobe from the bird; cutting a first whole leg from the bird; cutting a second whole leg from the bird; removing the bones from the first and second whole legs; cutting each of the first and second whole legs lengthwise into at least two boneless leg portions, each leg portion containing both thigh meat and drumstick meat; and assembling the first and second boneless breast lobes and the boneless leg portions to simulate the appearance of a bird.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings:

FIG. 5 is a perspective view of a first whole leg illustrating a cut line for forming the boneless leg portions;

FIG. 6 is a perspective view of a second whole leg partially cut to expose the leg bones;

DETAILED DESCRIPTION OF THE INVENTION

Figure 1:
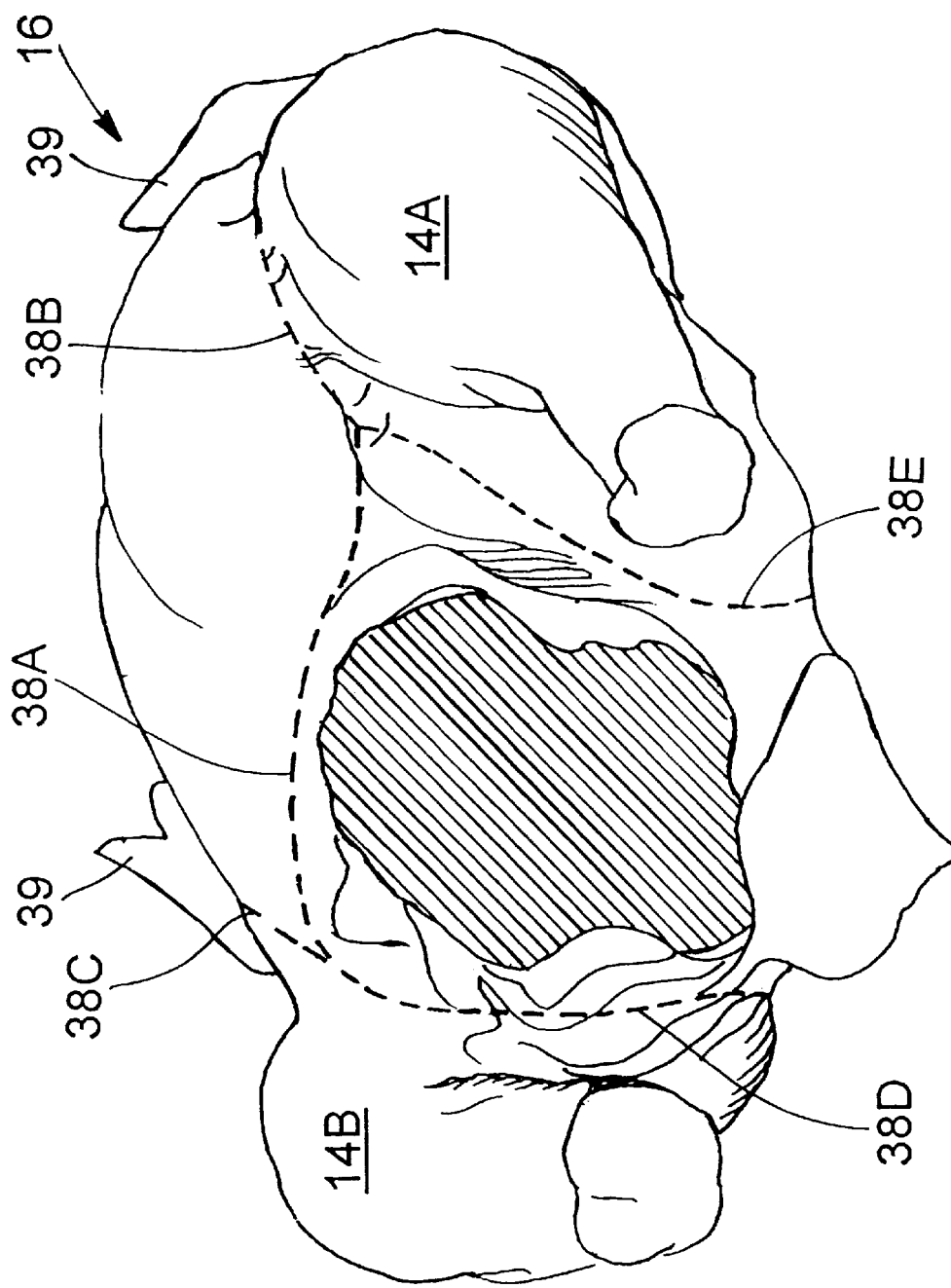
FIG. 1 is a perspective view of a bird illustrating cut lines for separating the whole legs and the entire breast section from the remainder of the bird.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the bird product and designated parts thereof. The terminology includes the words above specifically mentioned, derivatives thereof and words of similar import. Furthermore, the use of the word "a" in the specification and in the claims means "at least one."

Figure 8:
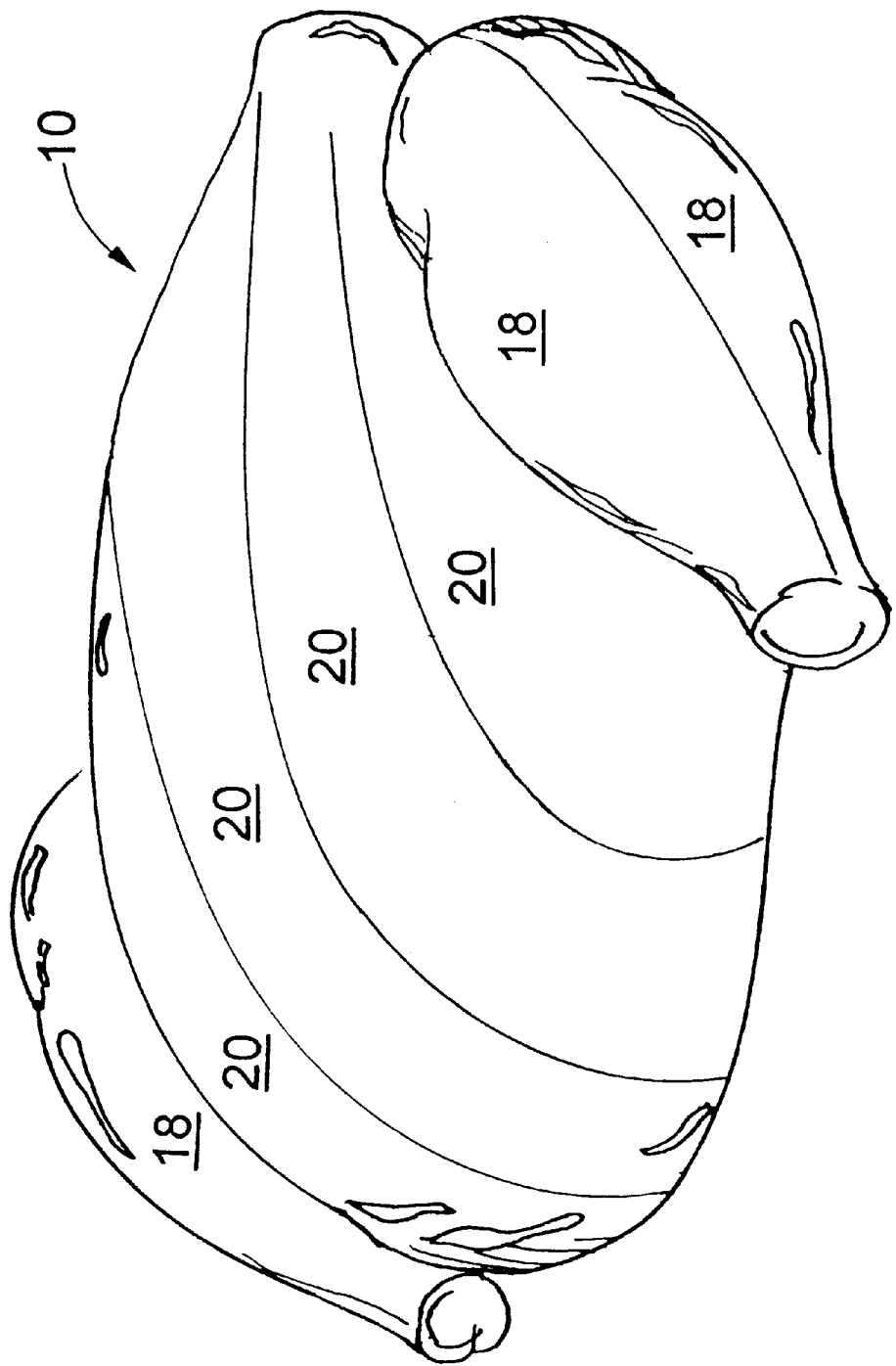
FIG. 8 is a perspective view of an assembled bird meat product of the present invention.

Referring to the drawings in detail, wherein like numerals indicate like elements throughout, there is shown in FIG. 8 a preferred embodiment of a bird meat product, generally designated 10, in accordance with the present invention. Generally speaking, a method of making the bird meat product 10 involves removing a first and second breast lobe 12A,12B (FIG. 4) from a bird, such as a chicken, 16 and removing a first and second whole bird leg 14A,14B (FIGS. 5 and 6) from the bird. Once the first and second whole legs 14A, 14B are removed from the bird 16, the first and second whole legs 14A,14B are deboned and cut lengthwise to form four boneless leg portions 18. The first and second breast lobes 12A,12B are also cut lengthwise to form four boneless breast portions 20. Afterwards, the four boneless leg portions 18 and the four boneless breast portions 20 can be dipped in batter, breaded, and then baked or deep fried. Once the various bird portions are cooked, the boneless leg portions 18 and the boneless breast portions 20 are assembled or arranged to simulate the appearance of a bird as shown in FIG. 8.

In general, birds 16 are surrounded by a covering of skin (not shown) as is well known to those skilled in the art. Various portions of the bird 16 may include some fat, gristle or cartilage (not shown). The gristle and cartilage are not pertinent to the present invention and, therefore, will not hereinafter be discussed.

While the preferred embodiments for manufacturing the bird product 10 preferably use the first and second breast lobe 12A,12B and the first and second whole legs 14A, 14B of a chicken, those of skill in the art will appreciate that the bird product 10 of the present invention is not limited to parts cut from chickens. For example, the bird product 10 of the present invention can be prepared using breast lobes and whole legs from pigeons, turkeys, ducks, geese, game hens, or any other poultry, fowl, or the like.

Figure 4:
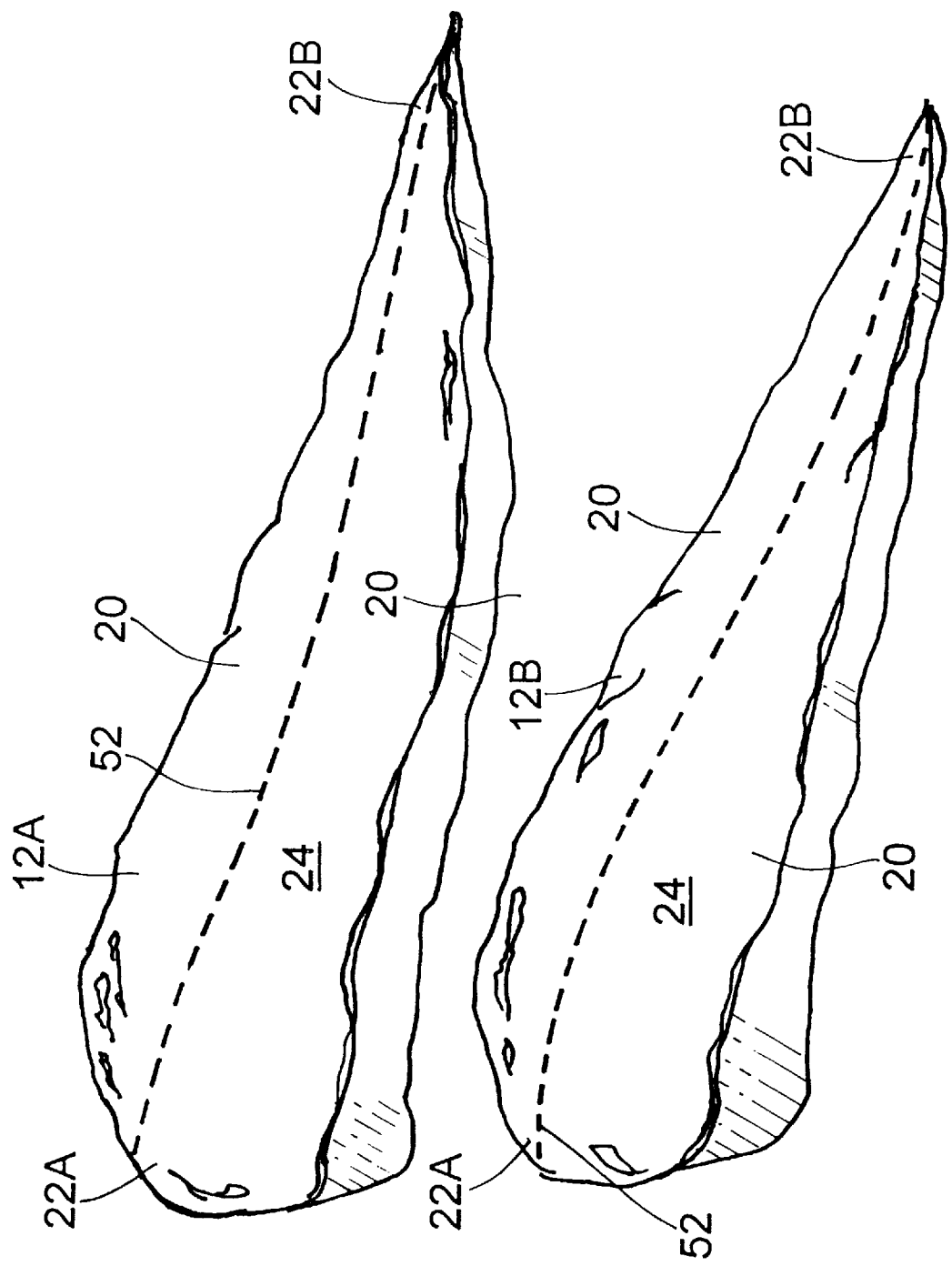
FIG. 4 is a perspective view of the separated first and second breast lobes illustrating cut lines for forming four boneless breast portions.

Referring to FIG. 4, both the first and second breast lobes 12A,12B are of a type of cut which is generally well known in the art and includes a first end 22A which, prior to butchering, had been connected proximate to the neck (not shown) of the bird, and a second end 22B which, prior to butchering, had been connected proximate to the tail (not shown) of the bird. The first and second breast lobes 12A,12B are generally elongated and have a tapered-shape as one moves from the first end 22A toward the second end 22B. In general, the breast meat 24 of the first and second breast lobes 12A,12B is considered to be "white meat" and is characterized as being drier and less chewy than meat from other parts of the bird. The breast meat 24 of the first and second breast lobes 12A,12B is generally symmetrical about a central longitudinal axis. The thickness of the meat 24 tapers inwardly from the first end 22A toward the second end 22B of the first and second breast lobes 12A,12B. The thickness of the meat 24 that extends along the central longitudinal axis of the first and second breast lobes 12A, 12B will vary depending on the type of bird and the weight or size of the bird from which the first and second breast lobes 12A and 12B come.

It is not critical to the present invention whether the first and second breast lobes 12A,12B are removed from the bird with their associated tenders. There are two tenders on each whole bird breast. One tender is located underneath each of the two breast lobes. Each tender is attached along a portion of its surface to the keel bone, and along another portion of its surface to the rib cage. The tender is a natural muscle which may be removed from the breast half as a single piece. There is a natural seam between each breast lobe and the associated tender.

Referring to FIGS. 5 and 6, the first and second whole legs 14A,14B are of a type which is generally well known in the art. Each of the first and second whole legs 14A,14B includes a first end 28A which, prior to butchering, had been connected to the body (not shown) of the bird, and a second end 28B which, prior to butchering, had been connected to the foot (not shown) of the bird. As shown in FIG. 6, each whole leg cut includes two primary elongated bones 47,48 that are interconnected and extend substantially the entire length of the first and second whole legs 14A,14B in a manner well known in the art. In each of the first and second whole legs 14A,14B, one bone 47 extends through the thigh portion of the leg and connects to a second bone 48 which extends through the drumstick portion of the whole leg.

In general, the first and second whole legs 14A,14B of the bird 16 are considered to be "dark meat" and are characterized as being moister and more flavorful than meat from other parts of the bird. The meat 30 extends generally symmetrically about a central longitudinal axis 32 of the first and second whole legs 14A,14B. The thickness of the meat 30 tapers inwardly from a first end 28A toward a second end 28B of the first and second whole legs 14A,14B. The thickness of the meat 30 that extends along the longitudinal length of the first and second whole legs 14A,14B will vary depending on the type of bird and the weight or size of the bird from which the first and second whole legs 14A,14B are cut. The first and second breast lobes 12A, 12B and the first and second whole legs 14A,14B as thus far described and as shown in FIGS. 4–6 are typical of the types of cuts commonly available from a butcher, a supermarket, etc.

The overall length of the first and second breast lobes 12A,12B and the first and second whole legs 14A,14B vary greatly depending upon the type of fowl or poultry and depending upon other factors including the age and weight of the bird from which the appropriate cuts are taken. In addition, the texture and other properties of the breast lobe meat 24 and the whole leg meat 30 will vary depending upon the type of fowl or poultry from which the parts are cut. It will be appreciated by those skilled in the art that neither the size nor the length of the first and second breast lobes 12A,12B and the first and second whole legs 14A,14B matter to the present invention. The method of the present invention is equally applicable to any size first and second breast lobes 12A,12B and to any size first and second whole legs 14A,14B from which a user desires to make the bird meat product 10.

Figure 2:
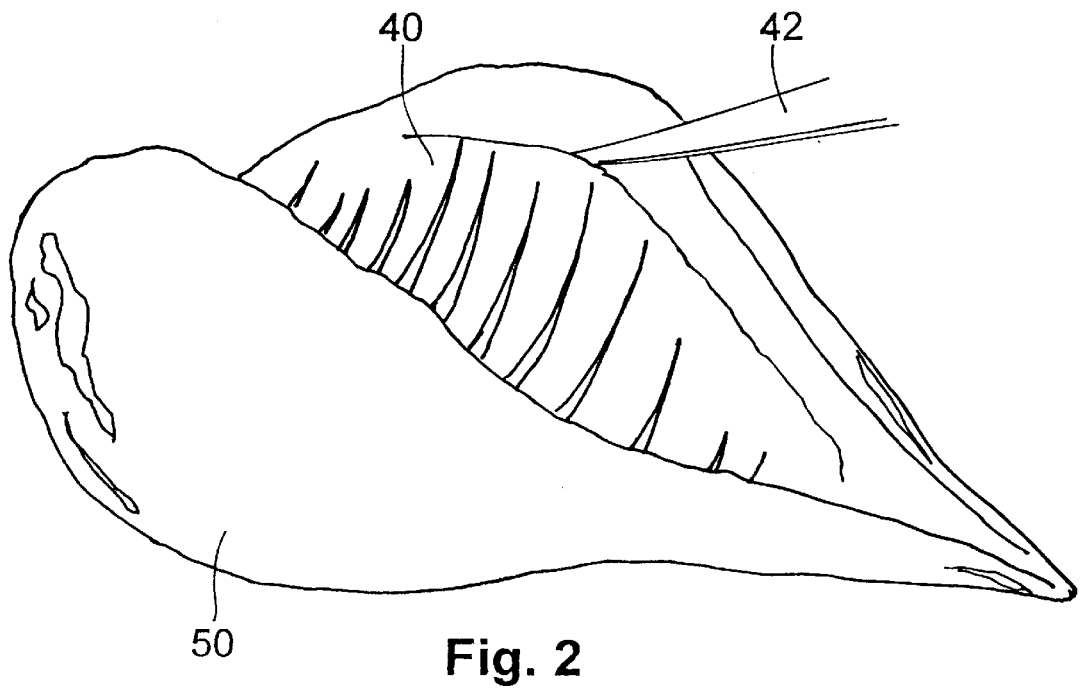
FIG. 2 is a perspective view of the entire breast section removed from the bird of FIG. 1 with the bones beginning to be manually removed.

All of the cutting steps are preferably performed with either a sharp knife (as shown in FIG. 2), a water jet, a sharp manual cutting instrument, a saw, a power cutting device, or an automated deboning apparatus. During the cutting and deboning steps, the bird carcass may be manipulated manually, or may be mounted on a deboning cone by placing the cone into the body cavity, and maintaining the bird carcass thereon. Examples of automated processes for cutting bird carcasses wherein the carcasses are mounted on deboning cones are shown in U.S. Pat. No. 5,194,035 issued to Dillard and in U.S. Pat. No. 4,385,419 issued to Cantrell, both of which are hereby incorporated by reference herein in their entirety.

Referring to FIG. 1, the wings 39 are preferably cut from the bird 16 prior to beginning the production of the bird meat product 10. Thus, the removed bird wings can be separately shipped or processed from the remainder of the bird 16. Those of skill in the art will appreciate from this disclosure that the wings 39 may be cut from the bird during the method of forming a meat product from a bird according to the present invention (detailed below) or may be cut from the remainder of the bird 16 afterwards without departing from the scope of the present invention. Accordingly, the cutting of the wings 39 and their future processing, use, or disposal thereof does not form part of the present invention.

Figure 3:
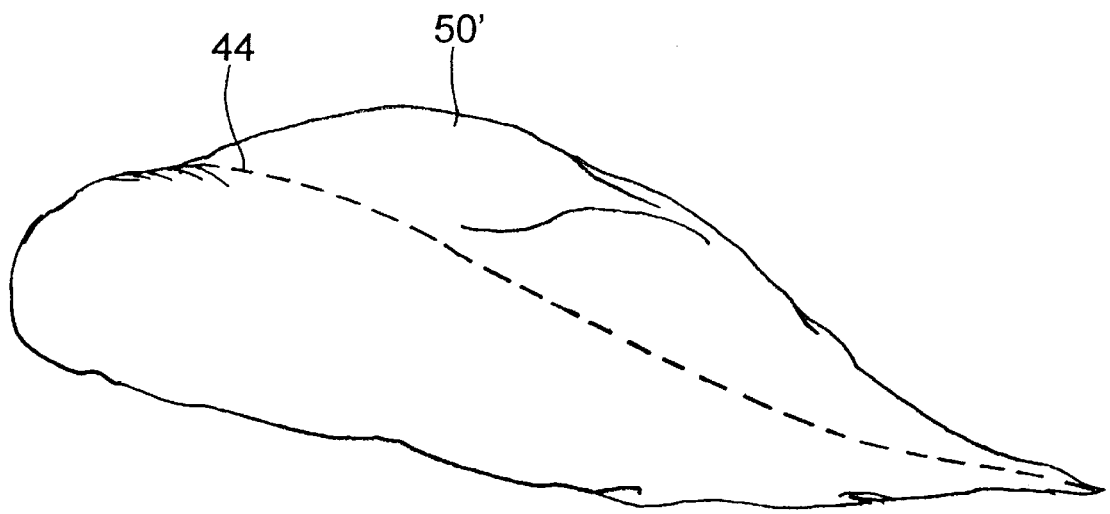
FIG. 3 is a perspective view of a deboned entire breast section illustrating a cut line for separating the first and second breast lobes.

The present invention comprises a method of making a meat product 10 from a bird 16 of the type described above. Referring to FIGS. 1–8, the bird meat product 10 of the present invention is prepared as follows. The first step is to cut a first boneless breast lobe 12A from the bird 16 and then, to cut a second boneless breast lobe 12B from the bird 16. As mentioned above there are many methods of cutting boneless breast lobes from a bird. One method of manually cutting breast lobes 12A,12B involves starting with a bird (shown in FIG. 1) and cutting the entire breast section of the bird therefrom. To separate the entire breast section 50 from the bird 16, the bird 16 is sliced along cut lines 38A, 38B, and 38C as shown in FIG. 1. Referring to FIG. 2, the entire breast section 50 is removed and then the bones 40 are removed with a sharp knife 42. Once the bones 40 are removed only a boneless breast section 50' remains, as shown in FIG. 3. The cut line 44 in FIG. 3 illustrates where the entire boneless breast section 50' is to be cut lengthwise to generate two boneless breast lobes 12A,12B as shown in FIG. 4.

While it is preferable to not remove the skin from the breast lobes 12A,12B, those of skill in the art will appreciate from this disclosure that depending on the desired bird product 10, the skin can be removed from the individual breast lobes without departing from the scope of the present invention. When the first and second and breast lobes 12A,12B are removed from the bird 16, each breast lobe forms a boneless portion of breast meat 24 similar to that of a chicken cutlet as shown in FIG. 4.

The bird product 10 is then further prepared by cutting each of the first and second breast lobes 12A,12B lengthwise into at least two boneless breast portions 20 (the boneless breast portions 20 are shown in FIG. 8). Referring to FIG. 4, to cut the first and second boneless breast lobes 12A,12B lengthwise, the first and second boneless breast lobes are sliced along cut line 44. While it is preferable that the first and second breast lobes 12A,12B are cut generally in half lengthwise to provide four generally equally sized boneless breast portions 20, those of skill in the art will appreciate from this disclosure that it is not necessary for the boneless breast portions to be equally sized. Depending upon manufacturing and consumer preferences, the size of each of the boneless breast portions 20 can be varied without departing from the scope of the present invention. The primary reason for cutting the first and second breast lobes 12A,12B into generally equal boneless breast portions 20 is to simplify the eating thereof by providing equally sized pieces.

While it is preferred, that the first and second breast lobes 12A, 12B be each cut into two boneless breast portions 20, it is understood by those of skill in the art that the present invention is not limited to first and second breast lobes 12A,12B that combined are sliced into four boneless breast portions 20. For example, the first and second breast lobes 12A,12B can be sliced into six or more boneless breast portions 20. Alternatively, the first and second breast lobes 12A, 12B can be left whole without departing from the scope of the present invention.

The bird product 10 is further prepared by cutting a first whole leg 14A from the bird 16 and then, cutting a second whole leg 14B from the bird 16. To separate the first and second whole legs 14A,14B from the bird 16, the bird is cut along cut lines 38B, 38C, 38D, and 38E in a manner well known in the art. Thus, the first and second whole legs 14A,14B, as shown in FIGS. 5 and 6, are separated from the bird.

The next step involves removing all of the bones from the first and second whole legs 14A,14B. FIG. 5 shows the first whole leg 14A and illustrates a cut line 46 for slicing the whole leg 14A to expose and manually remove the bones. FIG. 6 shows the second whole leg 14B partially cut lengthwise to expose the bones 47,48 therein. Additionally, cartilage is preferably also removed from the first and second whole legs 14A,14B. Once the bones 47,48 and the cartilage are removed from the first and second whole legs 14A,14B, the remaining meat of the first and second whole legs 14A,14B extends radially outward from a central longitudinal axis. As shown in FIGS. 5 and 6, the first and second whole legs 14A,14B are kept with the thigh portion 34 and the drumstick portion 36 connected together, thus, forming a generally continuous body of meat 30 which extends from the upper end of the thigh portion 34 of the whole leg through the lower end of the drumstick portion 36 of the whole leg.

Alternatively to manual deboning, the first and second whole legs 14A,14B, may be deboned using various techniques which are well known by those of skill in the art without departing from the scope of the present invention. For example, U.S. Pat. No. 5,297,984 discloses a method of partially deboning a drumstick and is incorporated by reference herein in its entirety. The particular method of deboning the bird 16 is not pertinent to the present invention.

Figure 7:
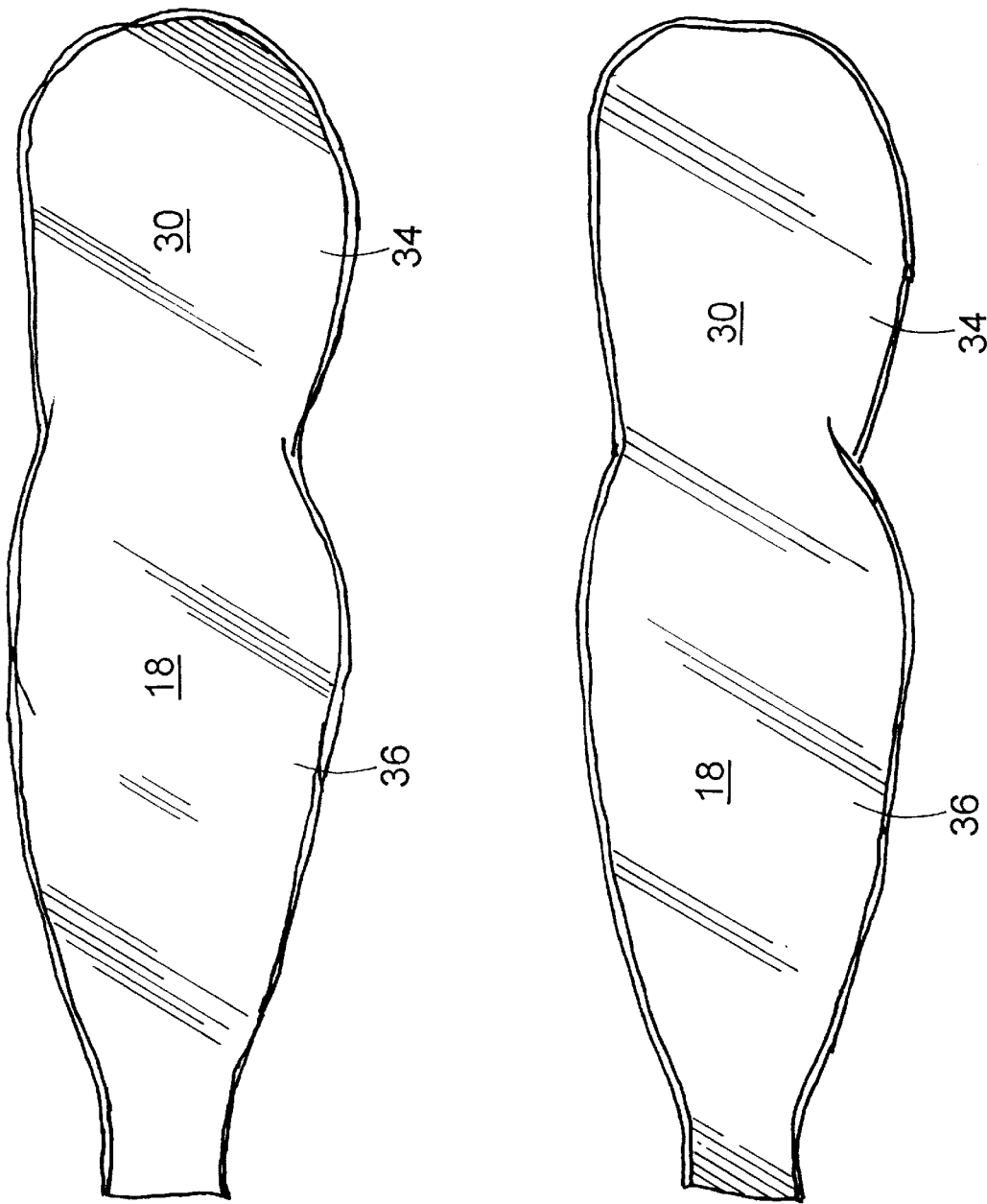
FIG. 7 is a plan view of two boneless leg portions formed from a whole leg.

The next step involves the cutting each of the first and second boneless whole legs 14A,14B lengthwise into at least two substantially boneless leg portions 18, each leg portion containing both thigh meat and drumstick meat as shown in FIG. 7. Accordingly, the first and second legs 14A,14B are cut generally along a longitudinal axis. It is preferable that the first and second whole legs 14A,14B are cut generally in half lengthwise to provide four generally equally sized substantially boneless leg portions 18 as shown in FIG. 8.

While it is preferred that the first and second whole legs 14A,14B are cut into four generally equally-sized boneless leg portions 18, those of skill in the art will appreciate from this disclosure that the present invention is not limited to the use of four equally sized substantially boneless leg portions 18. Each whole leg 14A,14B can be sliced into any number of boneless leg portions 18, such as three, four, seven, or more substantially boneless leg portions 18.

While it is preferable that the boneless leg portions 18 are generally equally-sized, those of skill in the art will appreciate from this disclosure that the present invention is not limited to using equally-sized boneless leg portions 18. For example, depending upon manufacturing preferences and consumer tastes, the first and second whole legs 14A,14B can be sliced in progressively thicker and thicker boneless leg portions 18.

It is preferred that the preparation of the bird meat product 10 include the step of marinating the boneless breast portions 20 and the boneless leg portions 18. To marinate the respective cuts, it is preferable to use an injection marination process using various sauces (not shown) depending on a consumer's taste and preferences. However, those of skill in the art will appreciate from this disclosure that various marination methods may be used without departing from the scope of the present invention.

In preparing the bird meat product 10, the boneless breast portions 20 and the boneless leg portions 18 are preferably cooked, using either baking or deep frying, prior to arranging the respective pieces to form the final bird product 10. When shipping the bird product 10 to retailers, the bird product 10 is preferably fully cooked and assembled prior to packaging and shipping. However, when shipping the bird product 10 to a food service, or similar organization, it is preferable to partially cook the boneless breast portions 20 and the boneless leg portions 18 to enable freezing and subsequent finish cooking thereof and assembly at or near the place of consumption.

In preparing the boneless breast portions 20 and the boneless leg portions 18 for deep frying it is preferable to apply a coating of batter (not shown) to the boneless breast portions 20 and to the boneless leg portions 18. On top of the coating of batter it is preferable to apply a layer of breading (not shown) to the boneless breast portions 20 and to the boneless leg portions 18.

After the coating of batter and the layer of breading have been applied to the boneless breast portions 20 and to the boneless leg portions 18, the respective cuts are par fried for 40 to 60 seconds to set the breading and batter. Then, the respective cuts are preferably immediately frozen. After the respective cuts have been frozen, the boneless leg portions 18 and the boneless breast portions 20, along with the batter coating and the layer of breading can be deep fried and assembled for final serving by a food service organization at or near the point of consumption.

The various bird portions can be either fully cooked for retailers or partially cooked and frozen to allow for packaging and shipping to food services or distributors. Once the respective cuts are partially cooked, frozen, and received by retailers, the bird product pieces can be quickly deep fried to complete the cooking process and thereafter assembled.

Referring to FIG. 8, the next step involves assembling or arranging the boneless breast portions 20 and the boneless leg portions 18 to simulate the appearance of a whole bird 16. That is, the boneless breast portions 20 and the boneless leg portions 18 are assembled (without the remaining portions of the bird, such as the bones, wings 39, etc.) so as to be in substantially the same relative location that they were in prior to removal from the bird 16. Thus, the final bird product 10 is produced with an appearance of a whole bird. The use, disposal, or handling of the remainder of the bird (i.e., the bones, wings 39, etc.) after the boneless breast portions 20 and the boneless leg portions are removed is not considered relevant to the present invention. While not preferable, the preparation of the bird meat product 10 can include the applying of a glaze to the arranged combination of the boneless breast portions and the substantially boneless leg portions either before or after the step of arranging the respective cuts to simulate the appearance of a bird.

Alternatively, the preparation of the bird product 10 can include the step of freezing and then, shipping to a recipient the arranged combination of the boneless breast portions and the boneless leg portions. Depending on the degree to which the bird product 10 was cooked prior to shipping, the recipient will preferably apply a finish cooking to the arranged combination of the boneless breast portions 20 and the boneless leg portions 18.

When the boneless breast portions 20 and the boneless leg portions 18 are shipped to a food service for sales at an athletic event or other gathering, the respective cuts can be shipped frozen and assembled to resemble a bird or, alternatively, the respective cuts can be shipped frozen and separated in bags according to the type of cut for assembly by the food service just prior to consumption.

When the bird product 10 is shipped to retailers, the respective cuts are fully cooked and preferably arranged to resemble a bird prior to packaging and shipping. Additionally, the final bird product 10 is completely frozen prior to shipping to the retailer, such as a grocery store, etc.

From the foregoing description, it can be seen that the present invention comprises a new and unique method of producing a bird meat product 10. The method is quick and easy to utilize and the resulting bird meat product 10 is both appetizing and convenient for the consumer to handle while generating a minimum amount of waste. It will be recognized by those skilled in the art that changes can be made to the above-described embodiment of the present invention without departing from the broad inventive concept thereof. It is understood, therefore, that this invention is not limited to particular embodiment disclosed, but it is intended to cover any modifications which are within the spirit and scope of the present invention and the appended claims.

I claim:

1. A method of making a meat product from a bird, comprising the steps of:

cutting a first boneless breast lobe from the bird;

cutting a second boneless breast lobe from the bird;

cutting each of the first and second boneless breast lobes lengthwise into at least two boneless breast portions;

cutting a first whole leg from the bird;

cutting a second whole leg from the bird;

removing the bones from the first and second whole legs;

cutting each of the first and second whole legs lengthwise into at least two boneless leg portions, each leg portion containing both thigh meat and drumstick meat; and assembling the boneless breast portions and the boneless leg portions to simulate the appearance of a bird.

2. The method of claim 1, further comprising the step of marinating the boneless breast portions and the boneless leg portions.

3. The method of claim 1, further comprising the step of removing the skin from the boneless breast portions and the boneless leg portions.

4. The method of claim 1, further comprising the step of applying a glaze to the assembled combination of the boneless breast portions and the boneless leg portions.

5. The method of claim 1, further comprising the step of fully cooking the boneless breast portions and the boneless leg portions prior to the arranging step.

6. The method of claim 1, further comprising the step of applying a coating of batter to the boneless breast portions and to the boneless leg portions.

7. The method of claim 6, further comprising the step of applying a layer of breading to the boneless breast portions and to the boneless leg portions.

8. The method of claim 1, further comprising the step of partially cooking the boneless breast portions and the boneless leg portions to enable freezing and subsequent finish cooking thereof.

9. The method of claim 1, further comprising the step of freezing and shipping to a recipient the assembled combination of the boneless breast portions and the boneless leg portions.

10. The method of claim 9, further comprising the step of applying a finish cooking to the assembled combination of the boneless breast portions and the boneless leg portions.

11. A method of making a meat product from a bird, comprising the steps of:

cutting a first boneless breast lobe from the bird;

cutting a second boneless breast lobe from the bird;

cutting each of the first and second breast lobes generally in half lengthwise to provide four generally equally sized boneless breast portions;

cutting a first whole leg from the bird;

cutting a second whole leg from the bird;

removing the bones from each of the first and second whole legs;

cutting each of the first and second whole legs generally in half lengthwise to provide four generally equally sized boneless leg portions, each leg portion containing both thigh meat and drumstick meat; and assembling the boneless breast portions and the boneless leg portions to simulate the appearance of a bird.

12. The method of claim 11, further comprising the step of cooking the boneless breast portions and the boneless leg portions prior to the assembly step.

13. The method of claim 11, further comprising the step of removing the skin from the boneless breast portions and the boneless leg portions.

14. A method of making a meat product from a bird, comprising the steps of:

cutting a first boneless breast lobe from the bird;

cutting a second boneless breast lobe from the bird;

cutting a first whole leg from the bird;

cutting a second whole leg from the bird;

removing the bones from the first and second whole legs;

cutting each of the first and second whole legs lengthwise into at least two boneless leg portions, each leg portion containing both thigh meat and drumstick meat; and assembling the first and second boneless breast lobes and the boneless leg portions to simulate the appearance of a bird.

15. A boneless meat product made in accordance with the method of claim 1.

16. A boneless meat product made in accordance with the method of claim 11.

17. A boneless meat product made in accordance with the method of claim 14.

* * * * *